(12) United States Patent
Shimizu et al.

(10) Patent No.: US 7,166,375 B2
(45) Date of Patent: Jan. 23, 2007

(54) MAGNETIC RECORDING MEDIUM UTILIZING A MULTI-LAYERED SOFT MAGNETIC UNDERLAYER, METHOD OF PRODUCING THE SAME AND MAGNETIC RECORDING AND REPRODUCING DEVICE

(75) Inventors: Kenji Shimizu, Ichihara (JP); Hiroshi Sakai, Ichihara (JP); Takashi Hikosaka, Tokyo (JP); Futoshi Nakamura, Ichikawa (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/029,204

(22) Filed: Dec. 28, 2001

(65) Prior Publication Data

US 2002/0127433 A1   Sep. 12, 2002

Related U.S. Application Data

(60) Provisional application No. 60/268,968, filed on Feb. 16, 2001.

(30) Foreign Application Priority Data

Dec. 28, 2000   (JP)   ............................ P2000-402774

(51) Int. Cl.
G11B 5/667   (2006.01)
G11B 5/673   (2006.01)
(52) U.S. Cl. .................... 428/828.1; 428/829; 428/831
(58) Field of Classification Search ................ 428/611, 428/615, 637, 669, 65.3, 332, 336, 409, 692, 428/694 TS, 694 TM, 900
See application file for complete search history.

(56) References Cited

U.S. PATENT DOCUMENTS

| | | | |
|---|---|---|---|
| 4,687,712 A * | 8/1987 | Sugita et al. ............... | 428/611 |
| 5,673,162 A * | 9/1997 | Saito ...................... | 360/327.22 |
| 5,750,270 A * | 5/1998 | Tang et al. ................. | 428/611 |
| 5,792,564 A * | 8/1998 | Hikosaka et al. ........... | 428/610 |
| 5,815,342 A * | 9/1998 | Akiyama et al. ......... | 360/97.01 |
| 6,270,885 B1 | 8/2001 | Hokkyo et al. | |
| 6,342,311 B1 * | 1/2002 | Inturi et al. ................. | 428/692 |
| 6,391,430 B1 * | 5/2002 | Fullerton et al. ........... | 428/212 |
| 6,468,670 B1 * | 10/2002 | Ikeda et al. ................. | 428/611 |
| 2002/0028357 A1 * | 3/2002 | Shukh et al. ........ | 428/694 TM |

(Continued)

FOREIGN PATENT DOCUMENTS

JP   59-063026 A   4/1984

(Continued)

*Primary Examiner*—Kevin M. Bernatz
(74) *Attorney, Agent, or Firm*—Sughrue Mion, PLLC

(57) ABSTRACT

A magnetic recording medium, a method for producing the same, and a magnetic recording and reproducing device are provided which can prevent spike noise and improve the error rate. The magnetic recording medium comprises at least one nonmagnetic substrate, a soft magnetic underlayer, an orientation control layer to control the orientation of the layer formed directly above the same, and a perpendicular magnetic layer having an axis of easy magnetization which is oriented mainly perpendicularly to the nonmagnetic substrate. The soft magnetic underlayer is formed with a multilayer structure having at least two soft magnetic layers and one or more separation layers interposed between the soft magnetic layers, and at least one of the soft magnetic layers comprises a material with a structure having no magnetic domain walls.

26 Claims, 4 Drawing Sheets

U.S. PATENT DOCUMENTS

2002/0058159 A1 * 5/2002 Kubota et al. ....... 428/694 TM

FOREIGN PATENT DOCUMENTS

| | | | |
|---|---|---|---|
| JP | 60-125919 | A | 7/1985 |
| JP | 60-214417 | A | 10/1985 |
| JP | 01-128226 | A | 5/1989 |
| JP | 05-109044 | A | 4/1993 |
| JP | 05-258274 | A | 10/1993 |
| JP | 06-139542 | A | 5/1994 |
| JP | 07-073429 | A | 3/1995 |
| JP | 07-085442 | A | 3/1995 |
| JP | 07-129946 | A | 5/1995 |
| JP | 10-214719 | A | 8/1998 |
| JP | 10-228620 | A | 8/1998 |
| JP | 11-149628 | A | 6/1999 |
| JP | 2000-348327 | A | 12/2000 |
| JP | 2001-155321 | A | 6/2001 |
| JP | 2001-155322 | A | 6/2001 |
| JP | 2001-331920 | A | 11/2001 |
| JP | 2002-133635 | A | 5/2002 |
| JP | 2002-170216 | A | 6/2002 |
| JP | 2002-197643 | A | 7/2002 |
| JP | 2002-042318 | A | 8/2002 |
| JP | 2003-045015 | A | 2/2003 |

* cited by examiner

[FIG. 1]
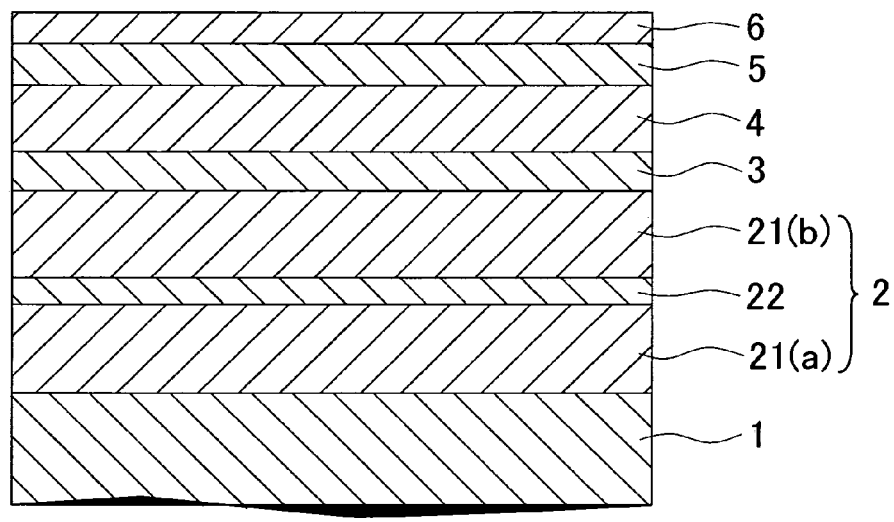
[FIG. 2]
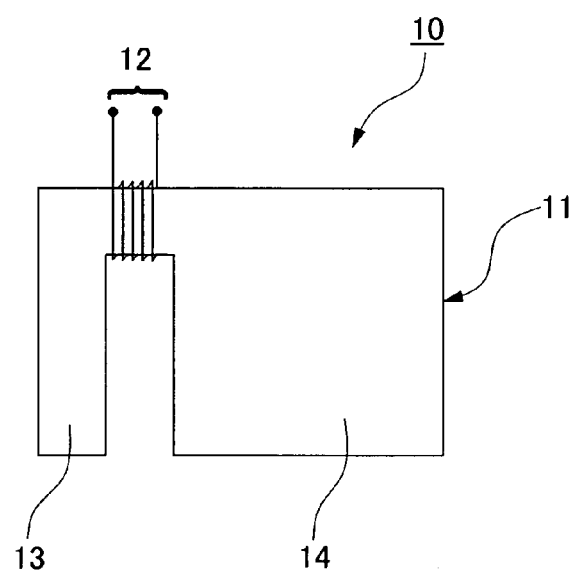

[FIG. 3]
(A)
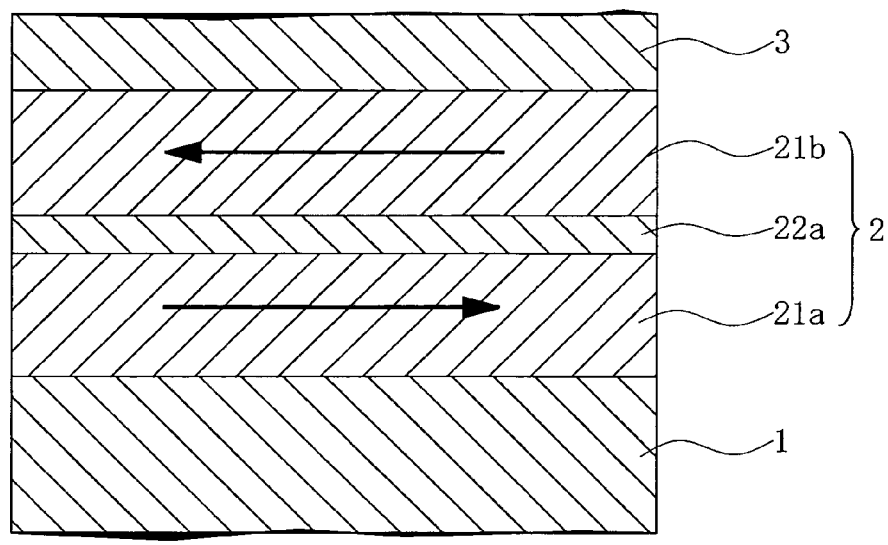
(B)
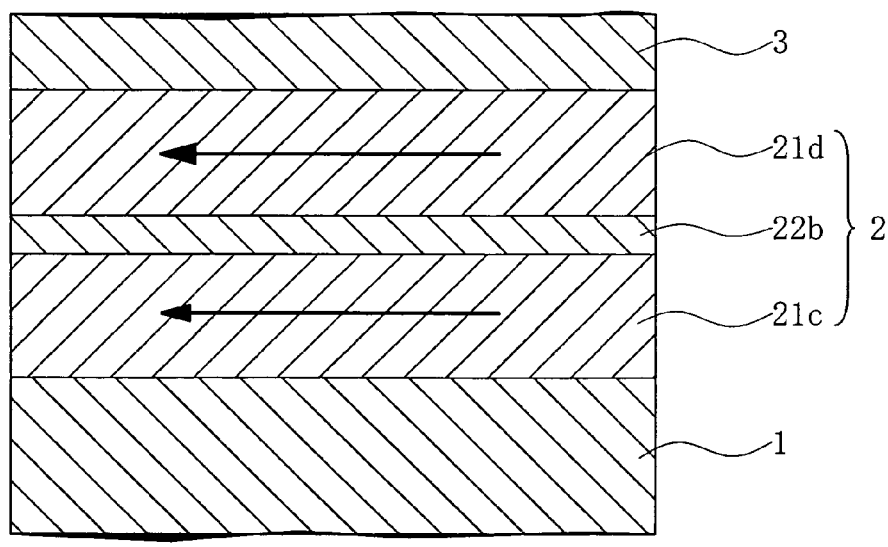

[FIG. 4]
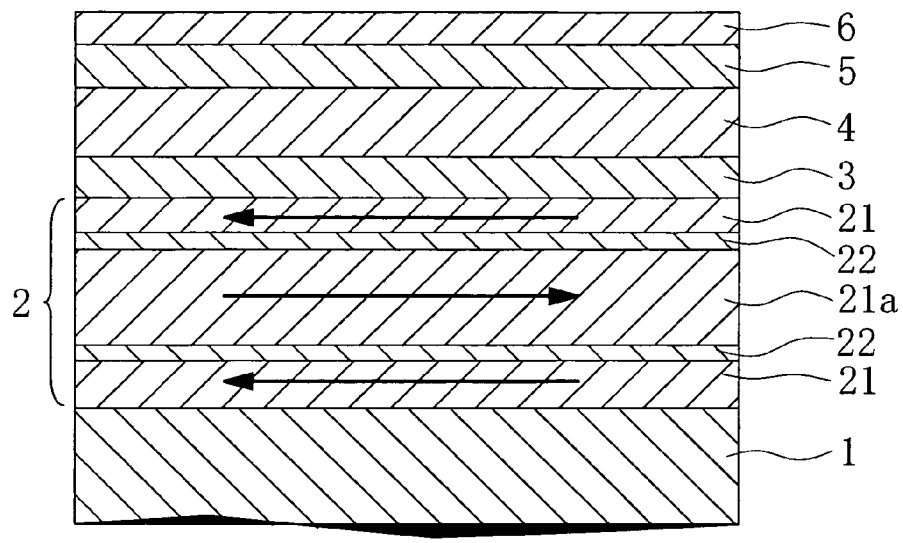
[FIG. 5]
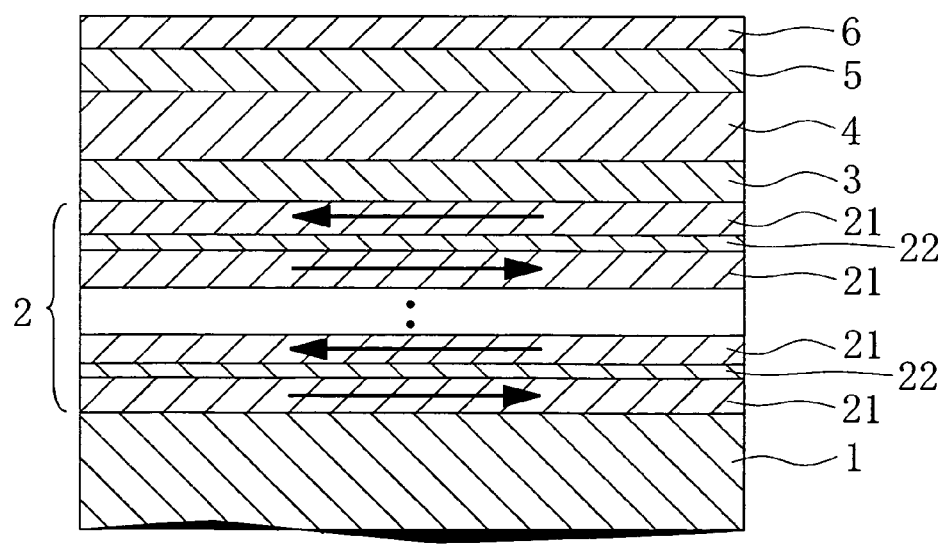

[FIG. 6]
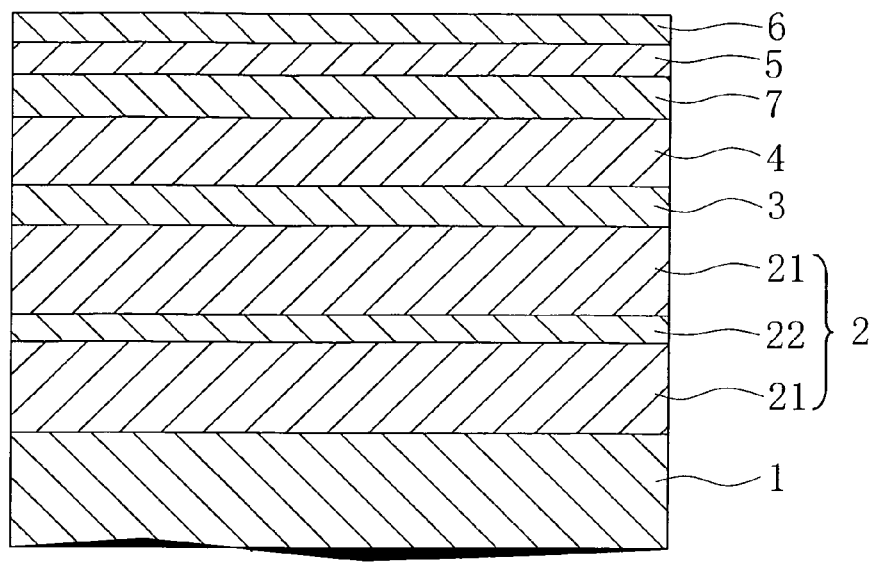
[FIG. 7]
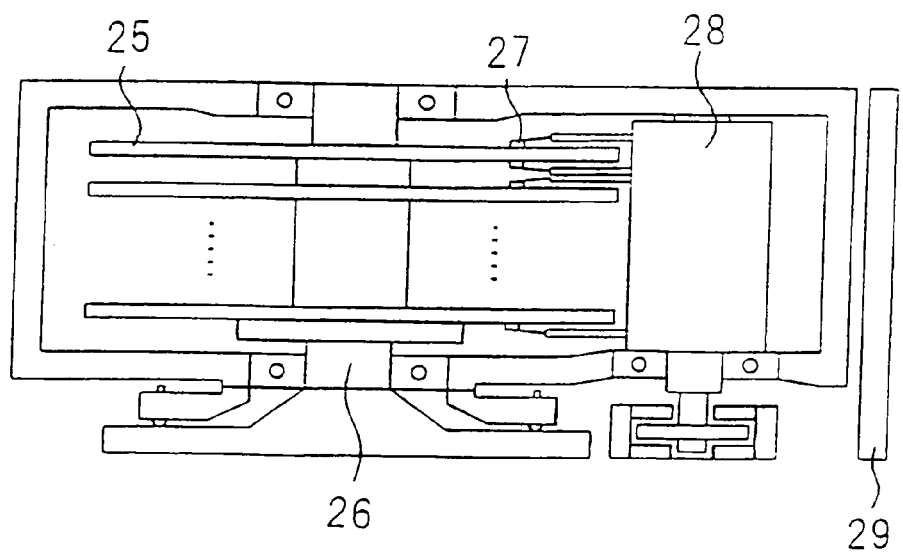

MAGNETIC RECORDING MEDIUM UTILIZING A MULTI-LAYERED SOFT MAGNETIC UNDERLAYER, METHOD OF PRODUCING THE SAME AND MAGNETIC RECORDING AND REPRODUCING DEVICE

This application claims benefit of earlier applications based on provisional U.S. Patent Application No. 60/268,968 (Filed: Feb. 16, 2001).

BACKGROUND OF THE INVENTION

1. Field of the Invention

The present invention relates to a magnetic recording medium, a method of producing the same and magnetic recording and reproducing device having a perpendicular magnetic film with an axis of easy magnetization which is oriented mainly perpendicularly with respect to the substrate.

2. Description of the Related Art

Recording media which are presently available on the market are mainly in-plane magnetic recording media having an axis of easy magnetization of the magnetic film oriented mainly parallel to the substrate.

For longitudinal magnetic recording media, in order to achieve high recording densities, it is necessary to attempt to reduce the noise by decreasing the particle diameter of the magnetic crystal grains, but if the particle diameter of the magnetic crystal grains is reduced, because the volume of the grains is reduced, deterioration in the reproducing characteristics can readily occur due to thermal fluctuations. Furthermore, when increasing the recording density, the noise of the medium can increase due to the effect of demagnetizing fields at the recorded bit boundaries.

In contrast, for a so-called perpendicular magnetic recording media, which have an axis of easy magnetization of the magnetic layer oriented mainly perpendicularly to the substrate, even if the recording density is increased, there is little effect from demagnetizing fields at bit boundaries, and because the boundaries can form sharply defined magnetic recording domain, the noise can be reduced.

Moreover, because high recording densities can be achieved for perpendicular magnetic recording media with relatively large crystal grains, the resistance to thermal agitations can also be increased, and as a result, they have attracted much attention in recent years. For example, Japanese Unexamined Patent Application, First Publication No. 60-214417 discloses a perpendicular magnetic recording medium wherein Ge and Si are used as materials for an underlayer for a perpendicular magnetic layer comprising a Co alloy.

Particularly, by combining a perpendicular two layer medium provided with a soft magnetic underlayer with a single-pole magnetic head, it is possible to obtain efficient reproducing. However, when this two layer medium is used, spike noise is observed from the magnetic domain walls of the soft magnetic underlayer, and the error rate increases. In order to solve this problem, Japanese Unexamined Patent Application, First Publication No. Hei 7-129946, discloses a method of providing a hard magnetic underlayer between the substrate and the soft magnetic underlayer in order to reduce the spike noise. Further, Japanese Patent Application No. Hei 10-214719 discloses a method of reducing the spike noise by using an Mn type antiferromagnetic material as the soft magnetic underlayer. Alternatively, Japanese Unexamined Patent Application, First Publication No. Hei 11-149628 discloses a method of suppressing the generation of spike noise by forming a backing layer having a structure having no magnetic domain walls wherein magnetic domains are not formed.

However, in the method disclosed in Japanese Unexamined Patent Application, First Publication No. 7-129946, the thickness of the hard magnetic underlayer must be 100 nm or more, and forming a layer of this thickness requires a very long time, which is not practical in terms of productivity. Further, noise due to the hard magnetic underlayer is detected by the magnetic head, giving rise to problems such as an unacceptable error rate. Further, in the method disclosed in Japanese Patent Application No. 10-214719, after forming the Mn type antiferromagnetic material into a film, it must be annealed in a magnetic field, and because it is necessary to add an annealing treatment, and because this annealing requires a long time, problems arise, such as reduced productivity. In the method disclosed in Japanese Unexamined Patent Application, First Publication No. Hei 11-149628, there is the problem that as the film thickness of the backing layer is increased, the medium noise increases and the error rate increases.

SUMMARY OF THE INVENTION

The present invention was made in consideration of the above explained circumstances, and has as an objective the provision of a magnetic recording medium, a method for manufacturing the same, and a magnetic recording and reproducing device which prevents spike noise and reduces the error rate.

In order to achieve the above objectives, the present invention is constituted as follows.

The magnetic recording medium of the present invention comprises, in sequence, on a nonmagnetic substrate, at least one soft magnetic underlayer, an orientation control layer to control the orientation of the layer immediately above, and a perpendicular magnetic layer having an axis of easy magnetization which is oriented mainly perpendicularly to the nonmagnetic substrate, and said soft magnetic underlayer is formed with a multilayer constitution having a plurality of soft magnetic layers comprising a soft magnetic material, and one or more separation layers interposed between said soft magnetic layers, and at least one of said soft magnetic layers comprises a material with a structure having no magnetic domain walls.

According to this constitution, the formation of large magnetic domains on the surface of the soft magnetic underlayer can be prevented, and the error rate can be improved.

In the magnetic recording medium of the present invention, the material with a structure having no magnetic domain walls can be selected from FeAlSi, FeTaN, FeTaC, FeC, FeAlSi type alloys, FeTaN type alloys, and FeTaC type alloys.

In the magnetic recording medium of the present invention, the separation layer can comprise 50 at. % or more of one of, or two or more of the elements Ru, Rh, Re, Ir, and Cu.

In the magnetic recording medium of the present invention, the product Bs·t (T·nm) of the saturation magnetic flux density per layer Bs (T) of the soft magnetic layer and the thickness of the soft magnetic layer t (nm), is 3 T·nm or more for each of the soft magnetic layers.

In the magnetic recording medium of the present invention, the magnetic flux density of the soft magnetic layer is 0.4 T or more.

In the magnetic recording medium of the present invention, the thickness of the soft magnetic underlayer is 40 nm or more.

In the magnetic recording medium of the present invention, the thickness of the separation layer is in the range from 0.1 nm to 5 nm.

In the magnetic recording medium of the present invention, among the sets of upper and lower soft magnetic layers between which a separation layer is interposed, at least one set has different directions of magnetization for the upper and lower soft magnetic layers.

In the magnetic recording medium of the present invention, at least one set of upper and lower soft magnetic layers between which a separation layer is interposed has directions of magnetization which are antiparallel.

In the magnetic recording medium of the present invention, the lowest layer of the soft magnetic underlayer comprises a material of one selected from the group consisting of FeAlSi, FeTaN, FeTaC, FeC, FeAlSi type alloys, FeTaN type alloys, and FeTaC type alloys.

In the magnetic recording medium of the present invention, the top layer of the soft magnetic underlayer is a soft magnetic layer.

In the magnetic recording medium of the present invention, a part of the surface or all of the surface of the soft magnetic underlayer nearest the perpendicular magnetic layer is oxidized.

As a result of the above constitution, the magnetic underlayer can be optimized, and the generation of very large magnetic domains can be suppressed, and a magnetic recording medium having excellent recording and reproducing characteristics can be obtained.

The method for producing the magnetic recording medium of the present invention is a method for producing a magnetic recording medium by forming, on a nonmagnetic substrate, at least one soft magnetic underlayer, an orientation control layer, a perpendicular magnetic layer having an axis of easy magnetization which is oriented mainly perpendicularly to the substrate, with the soft magnetic layer having a multilayer structure having a plurality of soft magnetic layers comprising a soft magnetic material, and one or more separation layers interposed between said soft magnetic layers, and one of more of the soft magnetic layers comprises a material with a structure having no magnetic domain walls.

As a result of this constitution, it is easy to produce a magnetic recording medium wherein the formation of very large magnetic domains can be prevented, and spike noise can be suppressed.

In the method for producing a magnetic recording medium of the present invention, the material with a structure having no magnetic domain walls comprises one selected from the group of FeAlSi, FeTaN, FeTaC, FeC, FeAlSi alloys, FeTaN alloys, and FeTaC alloys.

The method for producing a magnetic recording medium of the present invention also includes a treatment for oxidizing the surface of the soft magnetic underlayer.

According to this constitution, a magnetic recording medium having excellent recording and reproducing characteristics can be easily produced.

The magnetic recording and reproducing device of the present invention is provided with a magnetic recording medium having a least one nonmagnetic substrate, a soft magnetic underlayer, an orientation control layer to control the orientation of the layer immediately above it, and a perpendicular magnetic layer having an axis of easy magnetization which is oriented mainly perpendicularly to the nonmagnetic substrate, and a magnetic head for carrying out recording and reproducing of the information to and from the magnetic recording medium, the soft magnetic underlayer of the magnetic recording medium being formed with a multilayer constitution having a plurality of soft magnetic layers comprising a soft magnetic material, and one or more separation layers interposed between the soft magnetic layers.

According to this constitution, it is possible to inhibit the generation of spike noise and suppress degradation in the error rate during recording and reproducing, and therefore it is possible to obtain a magnetic recording and reproducing device which can recording and reproduce a high density of information.

In the magnetic recording and reproducing device of the present invention, the material with a structure having no magnetic domain walls comprises one selected from the group consisting of FeAlSi, FeTaN, FeTaC, FeC, FeAlSi type alloys, FeTaN type alloys, and FeTaC type alloys.

According to this constitution, the magnetic recording and reproducing device can have excellent magnetic recording and reproducing characteristics.

BRIEF DESCRIPTION OF THE DRAWINGS

FIG. 1 schematically shows a cross section of magnetic recording medium according to the first embodiment of the present invention.

FIG. 2 is a side view of a typical magnetic pole head.

FIGS. 3A and 3B are enlarged partial cross sectional views of the essential parts of the magnetic recording medium shown in FIG. 1.

FIG. 4 schematically shows a cross section of a magnetic recording medium according to the second embodiment of the present invention.

FIG. 5 schematically shows a cross section of a magnetic recording medium according to the second embodiment of the present invention.

FIG. 6 schematically shows a cross section of a magnetic recording medium according to the third embodiment of the present invention.

FIG. 7 is a cross sectional view showing an example of the constitution of the magnetic recording and reproducing device of the present invention.

DESCRIPTION OF THE EMBODIMENTS

The embodiments of the present invention will be explained below with reference to the Figures.

First Embodiment

FIG. 1 schematically shows a cross sectional view of the constitution of the magnetic recording medium according to the first embodiment of the present invention. As shown in FIG. 1, the magnetic recording medium according to this embodiment is provided with, on a nonmagnetic substrate 1, a soft magnetic underlayer 2 formed on the nonmagnetic substrate 1, an orientation control layer 3, a perpendicular magnetic layer 4, a protective layer 5 and a lubricating layer 6.

As the substrate 1, in addition to the aluminum alloy substrate having a plated layer of NiP commonly used for substrates for magnetic recording media, it is possible to use glass substrates (crystallized glass, tempered glass and the like), ceramic substrates, carbon substrates, silicon substrates, silicon carbide substrates and the like, and alternatively, it is possible to use such substrates having formed thereon a layer of NiP formed by plating or sputtering methods, or the like.

The soft magnetic underlayer 2 is provided to more strongly fix the orientation of the magnetization of the perpendicular magnetic layer 4, which records the information, in a direction perpendicular to the substrate 1. This effect is particularly noteworthy when the magnetic head used for recording and reproducing is a single magnetic pole head for perpendicular recording. FIG. 2 shows the typical constitution of a single pole magnetic head. This single pole magnetic head 10, as shown in FIG. 2 with a simplified constitution, is constituted by a magnetic pole 11 and a coil 12. The magnetic pole 11, when viewed from the side, resembles an inverted letter "U", with the thinner side forming the magnetic recording and reproducing portion which is the main pole 13, and the other side being the auxiliary pole 14. The main magnetic pole 13, when recording, generates a magnetic field which is applied to the perpendicular magnetic layer of the magnetic recording medium, and when reproducing, detects the magnetic flux from the perpendicular magnetic layer.

Using the above single pole magnetic head 10, when recording to the magnetic medium shown in FIG. 1, magnetic flux generated by the tip of the main magnetic pole 13 magnetizes the perpendicular magnetic layer 4 of the magnetic recording medium in a direction perpendicular to the substrate 1. Because this magnetic recording medium shown in FIG. 1 is provided with the soft magnetic underlayer 2, the magnetic flux from the main pole 13 of the single magnetic pole head 10 passes through the perpendicular magnetic layer 4 and the soft magnetic underlayer 2 and is guided to the auxiliary magnetic pole 14, forming a closed magnetic path. By forming a closed magnetic path between the single magnetic pole head 10 and the magnetic recording medium in this way, the efficiency of the application or the detection of the magnetic flux is increased, and high density recording and reproducing is possible. While the magnetic flux between the soft magnetic underlayer 2 and the auxiliary magnetic pole 14 is opposite in direction to the flux between the main magnetic pole 13 and the soft magnetic underlayer 2, because the surface area of the auxiliary magnetic pole 14 is sufficiently larger than that of the main magnetic pole 13, the magnetic flux density from the auxiliary magnetic pole 14 is sufficiently small that the magnetization of the perpendicular magnetic layer 4 is not affected by this magnetic flux from the auxiliary pole 14.

The soft magnetic underlayer 2 of the present embodiment, as shown in FIG. 1, has a multilayer structure comprising the soft magnetic layers 21A and 21B, and the separation layer 22 interposed between these soft magnetic layers 21A and 21B, and the soft magnetic layer 21A comprises a material with a structure having no magnetic domain walls. Although in the present embodiment, only the soft magnetic layer 21A comprises a material with a structure having no magnetic domain walls, it is, of course, also possible to use a constitution wherein only the soft magnetic layer 21B, or both of the soft magnetic layers 21A and 21B comprise a material with a structure having no magnetic domain walls.

As the material with a structure having no magnetic domain walls, FeAlSi, FeTaN, FeTaC, FeC, FeAlSi alloys, FeTaN alloys, FeTaC alloys, or materials wherein these alloys are the main components, can be mentioned. For example, it is possible to use a material in which Co, Ni, Ru, Si, N, O, B, C, or Hf is added to one of the above alloys in an amount of 10 at. % or less (preferably 7 at. % or less, more preferably 5 at. % or less).

As the material constituting the soft magnetic layer 21B, it is possible to use Fe alloys comprising 60 atomic % or more of Fe. More specifically, although there are no specific limitations, the following can be mentioned: FeCo type alloys (FeCo and FeCoV, and the like), FeNi type alloys (FeNi, FeNiMo, FeNiCr and FeNiSi, and the like), FeAl type alloys (FeAl, FeAlSi, FeAlSi, FeAlSiCr and FeAlSiTiRu, and the like), FeCr type alloys (FeCr, FeCrTi, and FeCrCu, and the like), FeTa type alloys (FeTa and FeTaC, and the like), FeC type alloys, FeN type alloys, FeSi type alloys, FeP type alloys, FeNb type alloys, FeHf type alloys, and the like.

Further, as the soft magnetic layer 21B, it is possible to use a film having microcrystal structure such as FeAlO, FeMgO, FeTaN, FeZrN, or a film having a granular constitution wherein microscopic crystal grains are dispersed in a matrix.

In the soft magnetic layer 21B, it is possible to use a Co alloy comprising 80 atomic % or more of Co, and at least one or more of Zr, Nb, Ta, Cr, Mo or the like. As preferable examples, CoZr, CoZrNb, CoZrTa, CoZrCr and CoZrMo can be mentioned. Further, the soft magnetic layer 21 can also have an amorphous constitution.

It is preferable for the soft magnetic layers 21A and 21B to have a saturation magnetic flux density of 0.4 T or more. This is because, if the saturation magnetic flux density is less than 0.4 T, it is not possible to achieve sufficiently effective control of the reproduced waveform. Further, it is preferable for the coercive force of the soft magnetic underlayer 2 to be as small as possible, and in practice, it is sufficient if it is below 200 (Oe) ($15.8 \times 10^3$ A/m), and it is preferably 50 (Oe) or less.

The thickness of each of the soft magnetic layers 21A and 21B is selected as the optimum thickness in view of the saturation magnetic flux density of the materials constituting each of these soft magnetic layers 21A and 21B. More specifically, the product Bs·t (T·nm) of the saturation magnetic flux density Bs (T) of the material comprising the soft magnetic layers 21A and 21B, and the layer thickness t (nm) is preferably 3 (T·nm) or more (more preferably from 10 (T·nm) to 130 (T·nm), and more preferably from 15 (T·nm) to 100 (T·nm)). Further, if Bs·t is 40 (T·nm), if the soft magnetic material used has a saturation magnetic flux density of 1 (T), the thickness of each of the soft magnetic layers 21 can be 40 (nm).

If the thickness of the layers 21A and 21B exceeds the upper limits of the above range, the diamagnetic field of the soft magnetic layers 21A and 21B becomes large, and this is not preferable because magnetic domains can form at the inner edge or the peripheral edge of the substrate. Furthermore, if the thickness is smaller than the lower limits of the above range, the function as a backing layer is lost, and it there is the possibility that the efficiency of the application or detection of the magnetic flux between the layer and the magnetic head will be reduced, and the recording to the perpendicular magnetic layer 4 will be insufficient.

The separation layer 22 is provided to prevent the formation of very large magnetic domains due to interaction between the soft magnetic layers 21A and 21B between which the separation layer 22 is interposed, and to which it is laminated. As the materials which can be used for the separation layer 22, it is possible to use antiferromagnetic materials which, together with the soft magnetic layers 21A and 21B, can form a bonded antiferromagnetic structure. More specifically, as the materials, Ru, Rh, Re, Ir and Cu and the like can be mentioned.

Further, in addition to the above, it is possible to use a soft magnetic material which differs from the material constituting the soft magnetic layers 21A and 21B, and this constitution makes it possible to prevent the formation of very large magnetic domains in the soft magnetic layers 21A and 21B. More specifically, it is possible to use any of the materials listed above for the soft magnetic layers 21A and 21B, and to select the most appropriate material according to the materials used for the soft magnetic layers 21A and 21B. For example, if FeAlSi is used for the soft magnetic layer 21A, and FeB is used for the soft magnetic layer 21B, then the separation layer 22 can be formed of CoZrNbN.

The thickness of the separation layer 22 is most appropriately chosen depending on the material constituting the separation layer 22, and is preferably in the range from 0.1 nm to 5 nm (more preferably from 0.1 nm to 2 nm). If the thickness exceeds this range, problems can occurs, such as the formation of very large magnetic domains in the soft magnetic layers 21A and 21B which can give rise to spike noise at the time of reproducing, or a decrease in the resolution, and high density recording will be difficult.

In particular, a material forming the above bonded antiferromagnetic structure is used as the separation layer 22, its thickness is limited by the material used. For example, if Ru is used for the separation layer 22, its thickness is 0.4 or 0.8 nm. This is because an antiferromagnetic material such as Ru can only form a bonded antiferromagnetic structure when each of the materials has a characteristic thickness, and for other layer thicknesses, a bonded antiferromagnetic structure is not formed, or sufficient effects cannot be obtained.

Further, between the above soft magnetic underlayer 2 and the substrate 1, it is possible to provide a hard magnetic layer comprising a hard magnetic material having an in-plane magnetic anisotropy. When this constitution is used, the soft magnetic underlayer 2 has a laminated structure, and it will have a bonded antiferromagnetic structure, and it is possible to more effectively suppress the formation of very large magnetic domains in the soft magnetic underlayer.

As a result, it is possible to prevent the generation of spike noise due to magnetic domain walls, and the error rate during recording and reproducing can be sufficiently reduced, and it is possible to make a magnetic recording medium having a high recording density.

As the material which can be used for the above hard magnetic layer, it is preferable to use magnetic materials comprising alloys of transition metals and rare earth elements, and more specifically, although there are no particular limitations, CoSm type alloys and CoCr type alloys can be mentioned. Further, in order to prevent the soft magnetic layer 21 which is a constituent of the soft magnetic underlayer 2 from forming magnetic domain walls in the radial direction of the substrate, the lowest layer forming the soft magnetic underlayer 2 and the hard magnetic material are strongly bonded to each other, and to be radially magnetized, oriented either towards the periphery or towards the center of the substrate. In this way, the magnetic permeability in the travel direction of the head is improved, and therefore, the recording characteristics can be improved.

The orientation control layer 3 is provided to control the orientation and the particle diameter of the below described perpendicular magnetic layer 4, and it is possible to use a material having an hcp structure, or an fcc material, or have a laminate structure of a layer having a B2 structure and a layer having an hcp structure or an fcc structure, or a material having an amorphous structure. More specifically, while there are no particular limitations, as a material having a B2 structure, NiAl, FeAl, CoFe, CoZr, NiTi, AlCo and the like can be mentioned. Further, as a material having an hcp structure, Ti, Zr, Y, Zn, Ru, Re, Hf and the like can be mentioned. As a material having a fcc structure, Ni, Pd, Pt, Al, Cu, Ag, Ir and the like can be mentioned. Alternatively, it is possible to add another element to the above materials (one or two or more of the elements selected from the group consisting of Cr, Mo, Si, Mn, W, Nb, Ti, Zr, B, C, N and O) to the extent that the structure of the material is not changed.

Further, as the material having an amorphous structure, C, Si, Co and the like, and their alloys, can be mentioned.

In the magnetic recording medium of the present invention, as a result of providing the above orientation control layer 3 between the soft magnetic underlayer 2 and the perpendicular magnetic layer 4, it is possible to refine the crystal grains which form the perpendicular magnetic layer 4 and realize an improvement in their perpendicular orientation. As a result, the magnetic recording medium of the present invention has excellent noise characteristics, and has high output characteristics appropriate for high density recording.

If the orientation control layer 3 is too thick, the resolution decreases, so it is preferably 50 nm or less (more preferably 30 nm or less). If the thickness of the layer exceeds the above range, during recording and reproducing, the distance between the magnetic head and the soft magnetic underlayer 2 becomes large, and the resolution of the reproduced signal decreases, which is not preferable because it degrades the recording and reproducing characteristics. Further, there is no limitation to how thin the layer can be made, provided that the material can maintain its structure, but practically speaking, the layer thickness is preferably 1 nm or more.

For the perpendicular magnetic layer 4, it is preferable to use a Co alloy. For example, CoCrPt alloys and CoPt alloys can be used, or it is possible to add at least one, or two or more elements selected from the group consisting of Ta, Zr, Nb, Cu, Re, Ru, V, Ni, Mn, Ge, Si, B, O, and N, and the like, to these alloys.

Further, the perpendicular magnetic layer can have a laminate structure of Co or Co alloys, and Pt or Pd. For this Co alloy, the above CoCrPt type alloys or CoPt type alloys can be used. In particular, in order to increase the perpendicular magnetic anisotropy, it is preferable to use a CoCrPt type alloy including 8–24 at. % of Pt.

Although the above-mentioned Co type alloys and the perpendicular magnetic layer having a laminated structure are all constituted as multicrystalline films, in the recording medium of the present invention, it is possible to use a perpendicular magnetic layer having a noncrystalline structure. More specifically, while there are no particular limitations, it is possible to use alloys including rare earth elements such as TeFeCo type alloys or the like.

If the perpendicular magnetic layer 4 has a multilayer structure comprising a transition metal (Co or a Co alloy) and a precious metal element (Pt, Pd or the like), it is preferable for the thickness of the precious metal layer to be in the range of from 0.4 nm to 1.4 nm. This is because, if the layer thickness is less than 0.4 nm, as the coercive force (Hc) and the nucleation field (Hn) are reduced, it also becomes difficult to control the layer thickness, and if it is larger than 1.4 nm, the noise characteristics become inferior. If the thickness of the layer comprising the transition metal and the layer comprising the precious metal are the same, then the layer thickness is preferably in the range from 0.1 nm to 0.6 nm, and more preferably from 0.1 nm to 0.4 nm. While there is no particular preference for which of the transition metal layer or the precious metal layer is the top layer of the perpendicular magnetic layer 4, it is preferable for the lowermost layer to be a precious metal layer.

Further, the thickness of the perpendicular magnetic layer 4 can be appropriately optimized in view of the desired reproduced output, and when the above Co alloy is used, if any of the layers used in a multilayer structure magnetic layer is too thick, then problems such as a degradation of the noise characteristics, and a reduction of the resolution will occur, and in practice, a thickness on the order of 3 nm to 100 nm is preferable.

It is possible to provide a nonmagnetic intermediate layer comprised of nonmagnetic elements between the orientation control layer 3 and the perpendicular magnetic layer 4. If this constitution is used, it is possible to improve the orientability and the coercive force of the perpendicular magnetic layer 4.

For this nonmagnetic intermediate layer, while there are no particular limitations, it is possible to use a nonmagnetic CoCr alloy, or a CoCr alloy to which one, two or more elements selected from the group consisting of Ta, Zr, Nb, Pt, Cu, Re, Ru, Ni, Mn, Ge, Si, O, N and B is added. It is also possible to use for the nonmagnetic intermediate layer a nonmagnetic alloy of Co and one, two or more of the elements selected from the group consisting of Ta, Zr, Nb, Pt, Cu, Re, Ru, Ni, Mn, Ge, Si, O, N, and B.

If this nonmagnetic intermediate layer is too thick, because the distance between the perpendicular magnetic layer 4 and the soft magnetic underlayer 2 becomes large, the resolution is reduced, and the noise characteristics are degraded, and therefore it is preferable for the layer thickness to be 20 nm or less, more preferably 10 nm or less.

The protective layer 5, in addition to preventing corrosion of the perpendicular magnetic layer 4, prevents damage to the surface of the medium when the head comes into contact with the medium, and ensures lubrication between the head and the medium, and therefore, it is possible to use well-known materials, for example, it can have, as a single component, C, $SiO_2$ or $ZrO_2$, or it can use these as the main component and include other elements. The thickness of the protective layer 5 is desirably within a range from 1 nm to 10 nm.

For the lubrication layer 6, well-known lubricating agents such as perfluoropolyether, fluorinated alcohols, or fluorinated carboxylic acids can be used. The type and thickness of the layer are appropriately optimized in consideration of the protective layer and the lubricating agent.

A characteristic point of the magnetic recording medium constituted according to the above embodiment is the point that the soft magnetic underlayer 2, as shown in FIG. 1, is constituted of a multilayer structure, and the soft magnetic layer 21A which is included in the soft magnetic underlayer 2 is constituted of a material with a structure having no magnetic domain walls. As a result of this structure, the soft magnetic layer 21A, which is a constituent of the soft magnetic underlayer 2, has no magnetic domain walls, and as a result, it is possible to prevent the formation of large magnetic domains directed along the surface plane of the substrate of the inner part of the soft magnetic layer 21B. Accordingly, it is possible to prevent spike noise which is generated by magnetic domain walls, and therefore, the recording and reproducing error rate can be made sufficiently low. This effect will be explained below with reference to FIG. 3. FIG. 3A is a partial cross-sectional view for the case of using a material forming a bonded antiferromagnetic structure as the separation layer, and FIG. 3B is a partial cross sectional view of the structure for the case of using a soft magnetic material as the separation layer.

First, the case of using a material forming a bonded antiferromagnetic structure as the separation layer 22a will be explained. As shown in the partial cross sectional structural view of FIG. 3A, the soft magnetic layer 21a comprising a material with a structure having no magnetic domain walls placed below the separation layer 22a (towards the substrate 1) has a structure having no magnetic domain walls, and this soft magnetic layer 21a and the soft magnetic layer 21b above (towards the perpendicular magnetic layer), which sandwich the separation layer 22, have magnetizations in opposite directions to each other within their planes. As a result, the magnetizations of the soft magnetic layer 21a and the soft magnetic layer 21b are fixed in opposite directions, and therefore the formation of large magnetic domains is prevented. Further, in the magnetic recording medium of the present embodiment, a layer comprising a material with a structure having no magnetic domain walls (the soft magnetic layer 21a) is further provided, and the generation of large magnetic domains can be more effectively suppressed. In particular, it is very effective at preventing the generation of magnetic domains in regions where the magnetic energy of the magnetic domains is unstable, such as the outer edge or the inner edge of the substrate.

Further, as a result of the magnetizations of the soft magnetic layer 21a and the soft magnetic layer 21b being in opposite directions to each other, the magnetizations of the soft magnetic layers 21a and 21b cancel each other and are not detected by the magnetic head. In other words, the noise arising from the magnetization of the soft magnetic layers 21a and 21b is not detected by the magnetic head, and therefore, the recording and reproducing characteristics of the magnetic recording medium are improved. Especially, it is preferable for the magnetization of the soft magnetic layers to be in the radial direction of the substrate, or oriented towards the periphery or towards the center of the substrate. In this way, the magnetic permeability in the travel direction of the head is improved, and the recording and reproducing characteristics can be improved.

Next, the case of using the material of the soft magnetic layer a the separation layer 22b will be explained. As shown in the partial cross sectional structural view in FIG. 3B, the soft magnetic layer 21c comprising a material with a structure having no magnetic domain walls placed below the separation layer 22b (towards the substrate 1) has a structure having no magnetic domain walls, and this soft magnetic layer 21c and the soft magnetic layer 21d on the upper side (towards the perpendicular magnetic layer), which sandwich the separation layer 22b, have magnetizations which are not fixed in opposite directions to each other, unlike the above case of using an antiferromagnetic material for the separation layer. However, because the separation layer 22b and the soft magnetic layer 21c and the soft magnetic layer 21d are constituted of different materials, the magnetic interaction between the soft magnetic layer 21c and the soft magnetic layer 21d is disrupted by the separation layer 22b. As a result, the soft magnetic layer 21c and the soft magnetic layer 21d together prevent the formation of large magnetic domains, and therefore the generation of spike noise from the magnetic domain walls of the boundaries of the magnetic domains can be prevented.

Especially, if a material such as FeAlSi, FeTaN or FeTaC or the like, which does not form magnetic domains, is used as the separation layer 22b, it is possible to obtain particularly excellent effects in inhibiting the formation of magnetic domains in the soft magnetic layers 21c and 21d.

In the soft magnetic underlayer constituted by forming the bonded antiferromagnetic structure shown in FIG. 3A, the film thicknesses of the soft magnetic layers 21a and 21b shown in FIG. 3A do not necessarily have to be the same. Namely, the soft magnetic layer 21a in the lower part of the figure (towards the substrate 1) can be made thinner (or thicker) than the soft magnetic layer 21b in the upper part of the figure (towards the orientation control layer 3). For example, if the same material is used for the soft magnetic layer 21a and the soft magnetic layer 21b, it is preferable for the soft magnetic layer 21a to be thinner than the soft magnetic layer 21b. This is done in order to make, for the soft magnetic layers 21a and 21b which face each other across the separation layer 22a, the depth of a bonded antiferromagnetic structure from the separation layer 22a, different for the soft magnetic layers 21a and 21b. More specifically, the depth from the separation layer 22a of the bonded antiferromagnetic structure formed in the soft magnetic layer 21a is less deep than the depth from the separation layer 22a of the bonded antiferromagnetic structure in the soft magnetic layer 21b above the separation layer 22a.

The above constitutions are provided with soft magnetic layers (the soft magnetic layers 21a and 21c) using a material with a structure having no magnetic domain walls towards the substrate 1, but the same effects can be obtained if the soft magnetic layer comprising a material with a structure having no magnetic domain walls is provided towards the orientation control layer 3.

The upper surface of the above soft magnetic underlayer 2 (the surface towards the orientation control layer 3) is preferably constituted of a partially oxidized or fully oxidized material forming the soft magnetic underlayer. That is, it is preferable for the material (for example, FeTaC or CoZr or the like) constituting the soft magnetic underlayer 2 (in FIG. 1, the surface towards the orientation control layer 3) and its vicinity to be partially oxidized at the surface of the soft magnetic underlayer 2 or in the vicinity thereof. By using this constitution, it is possible to refine the crystal grains of the orientation control layer formed on top of the soft magnetic underlayer 2 and to obtain improved effects of the recording and reproducing characteristics.

Further, if the uppermost layer of the soft magnetic underlayer 2 is constituted of a soft magnetic material, it is possible to inhibit magnetic fluctuations in the surface of the soft magnetic material by oxidizing the surface of the layer, and therefore, the noise which arises from these fluctuations is reduced and the recording and reproducing characteristics of the magnetic recording medium can be improved.

The oxidized portion of the surface of the soft magnetic underlayer 2 can be formed, for example, by the method of exposure to an oxygen-containing atmosphere after the formation of the soft magnetic underlayer 2, or by the method of introducing oxygen into the process gas at the time of forming the portion of the layer near the surface of the soft magnetic underlayer 2. More specifically, in the case of exposing the surface of the soft magnetic underlayer 2 to oxygen, the surface can be maintained in a gaseous atmosphere of elemental oxygen or oxygen diluted in a noble gas such as argon for on the order of 1–20 seconds. Particularly in the case of using oxygen diluted in a noble gas such as argon, it is easy to adjust the extent of oxidation of the surface of the soft magnetic underlayer 2, and therefore, stable manufacturing can be carried out. Further, in the case of introducing oxygen into the process gas for layer formation of the soft magnetic underlayer 2, for example when using the sputtering method for layer formation, sputtering can be carried out while introducing oxygen into the process gas during only a part of the time over which the sputtering is carried out. As the process gas, it is preferable to use, for example, oxygen mixed into argon gas in a volume ratio on the order of 0.05 to 10%.

Second Embodiment

A soft magnetic underlayer 2 comprising two soft magnetic layers 21 and one separation layer 22 was explained above, but it is also possible to use a constitution wherein the soft magnetic underlayer 2 comprises n layers (n is 3 or more) of the soft magnetic layers 21, of which one or more layers comprise a material with a structure having no magnetic domain walls, with (n−1) separation layers 22 being interposed between this plurality of soft magnetic layers 21. This structure will be explained in detail below with reference to FIGS. 4 and 5.

FIG. 4 schematically shows a partial cross sectional structural view of an example of the magnetic recording medium of the second embodiment of the present invention. The magnetic recording medium shown in this figure differs from the recording medium of the first embodiment shown in FIG. 1 in the point that the soft magnetic underlayer 2 is constituted of three layers of the soft magnetic layers 21, and two layers of the separation layers 22 interposed between these soft magnetic layers 21. The constitutional elements shown in FIG. 4 which are the same as the constitutional elements of FIG. 1 have the same reference numbers as in FIG. 1, and explanations thereof are omitted.

As shown in FIG. 4, in the magnetic recording medium of the present embodiment, a soft magnetic underlayer 2 is formed by laminating, in sequence, from the substrate 1, a soft magnetic layer 21, a separation layer 22, a soft magnetic layer 21a, a separation layer 22, and a soft magnetic layer 21. This soft magnetic underlayer 2 comprises at least one material with a structure having no magnetic domain walls. By means of this constitution, for example, if the separation layer 22 is a layer comprising the above antiferromagnetic material, the soft magnetic layers 21 and 21a which face each other across the separation layer 22 can be made to have magnetization directions which are opposite to each other within the plane of the substrate 1. Accordingly, the magnetizations of the two soft magnetic layers 21 and 21a which face each other across the separation layer 22 cancel each other, and it is possible to reduce the medium noise arising from the soft magnetic layers 21 and 21a. Especially, it is preferable for the magnetization of the soft magnetic layer to be in a radial direction, oriented towards the periphery of the substrate or oriented towards the center of the substrate. In this way, the magnetic permeability in the travel direction of the head is improved, and therefore, the recording and reproducing characteristics are improved.

Further, the separation layer 22 can be constituted using a soft magnetic material, in the same way as in the above first embodiment. The soft magnetic materials that can be used for the separation layer 22 are as described above, and can be used with no problem provided that they differ from the materials of the soft magnetic layers 21,21a.

As in the case shown in FIG. 4, the soft magnetic underlayer 2 includes a soft magnetic layer comprising a material with a structure having no magnetic domain walls, the soft magnetic layers 21 and 21a facing each other across the separation layer 22 can together very effectively prevent the formation of large magnetic domains. As a result, it is possible to prevent an increase in the error rate due to spike noise at the time of recording and reproducing.

Furthermore, the soft magnetic underlayer 2, as shown in the partial cross sectional structural view of FIG. 5, can have a structure wherein a plurality of soft magnetic layers 21, and separation layers formed between these soft magnetic layers, are laminated together. In this case also, one or more of the soft magnetic layers 21 comprises a material with a structure having no magnetic domain walls.

As a result of this constitution, by means of the bonded antiferromagnetic structure formed using the separation layer 22, the magnetization in the soft magnetic layer 21 can be more strongly directed in a direction in the plane of the substrate. As a result, in the soft magnetic underlayer shown in FIG. 5, it is possible to make the soft magnetic layer 21 thinner than in the soft magnetic underlayer 2 shown in FIG. 4, and therefore, the thickness of the soft magnetic layer 21 which forms a bonded antiferromagnetic structure using the separation layer 22 can be reduced. As a result, the effect of fixing the magnetization of the soft magnetic layer 21 by the separation layer 22 does not become weakened as the distance from the separation layer 22 increases.

Furthermore, because the magnetizations of the soft magnetic layers 21 facing each other across the separation layer 22 in the embodiment of the magnetic recording medium shown in FIG. 5 cancel each other, it is of course also possible to obtain the effect of reduced medium noise. Especially, it is preferable for the magnetizations of the soft magnetic layers to be directed along the radius of the substrate, oriented towards the periphery of the substrate or towards the center of the substrate. As a result, the magnetic permeability in the direction of head travel is improved, and the recording and reproducing characteristics are improved.

Further, in the soft magnetic underlayer 2 having the constitution shown in FIG. 4 or FIG. 5, in the same way as in the above first embodiment, the thickness of the soft magnetic layer is preferably in a range wherein the product Bs·t (T·nm) of the saturation magnetic flux density Bs (T) and the layer thickness t (nm) of the soft magnetic material 21 is 3 (T·nm) or more. Moreover, if the product Bs·t is 40 (T·nm), if a soft magnetic material having a saturation magnetic flux density of 1 (T) is used, then the thickness of each of the soft magnetic layers 21 can be 40 (nm). The reason for the above range being preferable is as explained above.

Further, in the same way as for the above first embodiment, the most appropriate layer thickness is selected according to the material constituting the separation layer 22.

In the magnetic recording medium of the present embodiment, also, as shown in FIG. 4 and FIG. 5, the uppermost layer of the soft magnetic underlayer 2 can be either a soft magnetic layer 21 or an separation layer 22. However, in the case that an antiferromagnetic material is used as the separation layer 22, it is preferable for the uppermost layer of the laminate of the soft magnetic underlayer 2 to be a soft magnetic layer 21, in order to obtain the largest effect of noise reduction by cancellation of the magnetizations of the soft magnetic layers facing each other across the separation layer 22.

Furthermore, in the magnetic recording medium of the present embodiment, it is also possible to for a part or all of the upper surface of the soft magnetic underlayer 2 to have an oxidized constitution. If such a constitution is used, it is possible to refine the crystal grains of the orientation control layer 3 formed on top of the soft magnetic underlayer 2 and reduce the medium noise. Especially, in the case that a soft magnetic layer 21 is provided as the uppermost layer of the soft magnetic underlayer 2, it is possible to inhibit magnetic fluctuations in the surface of the soft magnetic layer, and therefore, it is possible to reduce the noise arising from these fluctuations.

Third Embodiment

The third embodiment of the present invention will be explained below with reference to the figures. FIG. 6 is a cross sectional view schematically showing the structure of the magnetic recording medium of the third embodiment of the present invention. The embodiment of the magnetic recording medium of the present invention shown in FIG. 6 differs from the embodiment of the magnetic recording medium shown in FIG. 1 in the point that a magnetization stabilizing layer 7 comprising a soft magnetic material is provided between the perpendicular magnetic layer 4 and the protective layer 5. In FIG. 6, the constituent elements which are the same as those in FIG. 1 are indicated by the same reference numerals, and explanations thereof are omitted.

The magnetization stabilizing layer 7 is a layer comprising a soft magnetic material formed on the perpendicular magnetic layer 4 or on the separation layer (explained below) formed on the perpendicular magnetic layer 4. As the material constituting the magnetization stabilizing layer 7, it is possible to use an alloy comprising 60 at. % Fe or more. More specifically, while there are no particular limitations, FeCo type alloys (FeCo, FeCoV and the like), FeNi type alloys (FeNi, FeNiMo, FeNiCr, FeNiSi and the like), FeAl type alloys (FeAl, FeAlSi, FeAlSiCr, FeAlSiTiRu, and the like), FeCr type alloys (FeCr, FeCrTi, FeCrCu and the like), FeTa type alloys (FeTa, FeTaC and the like), FeC type alloys, FeN type alloys, FeSi type alloys, FeP type alloys, FeNb type alloys, FeHf type alloys and the like can be mentioned.

Further, as the material constituting the magnetization stabilizing layer, a layer having a microcrystal structure such as FeAlO, FeMgO, FeTaN, FeZrN and the like, or a granular constitution where microscopic crystal grains are dispersed in a matrix.

Alternatively, in addition to the above, the magnetization stabilizing layer 7 can also comprise a Co alloy comprising 80 at. % of Co or more, and at least one of Zr, Nb, Ta, Cr, Mo and the like. For example, CoZr, CoZrNb, CoZrTa, CoZrCr, CoZrMo and the like can be mentioned as preferable examples. The magnetization stabilizing layer 7 can also be a material having an amorphous structure.

It is preferable for the saturation magnetic flux density of the magnetization stabilizing layer 7 to be 0.4 T or more. This is because, if the saturation magnetic flux density is less than 0.4 T, in order to inhibit fluctuations in the magnetic flux of the surface of the perpendicular magnetic layer 4, an excessively large layer thickness would be required. Further, it is preferable for the coercive force of the magnetization stabilizing layer 7 to be as small as possible, but in practice, it is acceptable if it is 200 (Oe) ($15.8 \times 10^3$ A/m) or less.

The thickness of the magnetization stabilizing layer 7 is determined according to the saturation magnetic flux density of the material constituting the magnetization stabilizing layer 7. More specifically, the product Bs·t (T·nm) of the saturation magnetic flux density Bs (T) and the material comprising the magnetization stabilizing layer 7, and the layer thickness t (nm) is preferably in the range of from 0.5 (T·nm) to 7.2 (T·nm), and more preferably from 0.5 (T·nm) to 3.6 (T·nm) or less. Further, if Bs·t is 2 (T·nm), if the soft magnetic material used has a saturation magnetic flux density of 1 (T), the thickness of the magnetization stabilizing layer 7 can be 2 (nm).

The magnetization stabilizing layer 7 is formed directly below the protective layer 5, and therefore, its surface roughness (Ra) affects the amount of flotation of the head. Accordingly, for the head flotation height required for high density recording, it is preferable for the surface roughness (Ra) to be less than 2 nm.

The surface of the magnetization stabilizing layer 7 (the surface towards the protective layer 5 in the drawing) can have a constitution which is partially or completely oxidized. Namely, the material constituting the surface of the magnetization stabilizing layer 7 at the surface or in the vicinity of the surface is partially oxidized, or is constituted to form an oxide of the material. As a result of this constitution, it is possible to reduce the fluctuations in the magnetization in the vicinity of the interface between the magnetization stabilizing layer 7 and the protective layer 5, and therefore, the noise characteristics can be improved.

The oxide of the surface of the magnetization stabilizing layer 7 can be made by the same technique as described above for the soft magnetic underlayer 2. Namely, it can be formed by a method of exposing the surface of the magnetization stabilizing layer 7 to oxygen or to an atmosphere containing oxygen, or by a method of forming the surface portion of the magnetization stabilizing layer 7 with a process gas in which oxygen is added to a noble gas.

By the constitution described above, in which a magnetization stabilizing layer 7 is provided between the perpendicular magnetic layer 4 and the protective layer 5, it is possible to improve the thermal demagnetization resistance and the reproducing output can be improved. This is because the magnetization stabilizing layer 7 absorbs the fluctuations in magnetic flux which occur at the surface of the perpendicular magnetic layer 4. Further, as a result of providing the magnetization stabilizing layer 7, it is possible to form a closed magnetic path with the magnetization of the perpendicular magnetic layer 7 which is normal to the substrate 1, and the in-plane magnetizations of the soft magnetic underlayer 2 or the magnetization stabilizing layer 7. As a result of this action, the magnetization of the perpendicular magnetic layer 4 is more strongly fixed, and it is possible to obtain a magnetic recording medium having excellent thermal demagnetization resistance.

The magnetization stabilizing layer 7 has particularly notable effects when the protective layer 5 is a carbon film formed by the CVD method or the ion beam method. If the protective layer 5 is a CVD carbon layer or ion beam carbon layer as described above, it will have a better hardness than an ordinary thin carbon layer, and therefore, the layer can be made thinner, and the distance between the perpendicular magnetic layer 4 and the magnetic head can be reduced. However, such a thin layer, also known as a DLC (diamond-like carbon) layer, is an insulator, and therefore, its surface can very easily acquire a charge. Therefore, the magnetization of the perpendicular magnetic layer 4 may be destabilized by magnetic fields due to charges retained on the surface.

Therefore, because the magnetic recording medium of the present invention is provided with the magnetization stabilizing layer 7, the perpendicular magnetic layer 4 is shielded from the magnetic fields due to the charges at the surface of the protective layer 5, and the magnetization stabilizing layer 7 has the role of protecting the magnetization of the perpendicular magnetic layer 4. As a result, in the magnetic recording medium of the present invention, even if an extremely thin CVD carbon layer or ion beam carbon layer is used as the protective layer, there is no degradation in the demagnetization heat resistance, and the magnetization stabilizing layer 7 of the present invention is especially effective in the case that the protective layer 5 has an extremely small thickness of 5 nm or less, and the perpendicular magnetic layer 4 can be easily affected by the charges on the surface of the protective layer 5.

FIG. 6 shows an example where the magnetization stabilizing layer 7 is applied to a magnetic recording medium having a soft magnetic underlayer 2 comprising two soft magnetic layers 21, and an separation layer 22 interposed between these soft magnetic layers, but the magnetization stabilizing layer 7 can also be applied to a magnetic recording medium provided with a soft magnetic underlayer 2 comprising three or more soft magnetic layers 21, and a plurality of separation layers 22, such as the above-mentioned magnetic recording medium of the second embodiment of the present invention, and even in this case, the same excellent effects as above can be obtained.

Method of Producing Magnetic Recording Medium

In the method of producing a magnetic recording medium having the above constitution, a soft magnetic underlayer 2 is formed by a sputtering method or the like on the substrate 1 as shown in FIG. 1, after which an oxidation process is applied to the surface of the soft magnetic underlayer 2 if required, and then the orientation control layer 3, the perpendicular magnetic layer 4, and the protective layer 5 are formed in sequence by a film forming method such as sputtering. Then, the lubrication layer 6 is formed by a method such as a dip coating method, a spin coating method or the like.

The method for producing the above magnetic recording medium can also include, if necessary, a process for forming a hard magnetic layer between the substrate 1 and the soft magnetic underlayer 2, a process for forming a nonmagnetic intermediate layer between the orientation control layer 3 and the perpendicular magnetic layer 4, a process for forming a magnetization stabilizing layer 7 between the perpendicular magnetic layer 4 and the protective layer 5 as shown in FIG. 6, and a process for oxidation treatment of the surface of the magnetization stabilizing layer 7.

In the method for producing the above magnetic recording medium, the soft magnetic underlayer 2 can be formed by alternately using a target comprising the material of the soft magnetic underlayer 21 or a target comprising the material with a structure having no magnetic domain walls, and a target comprising the material of the separation layer 22, and layer formation can be carried out by alternately sputtering the materials of each of the targets. If the soft magnetic underlayer is constituted of different materials depending on the layer, for example, a layer comprising FeAlSi for the soft magnetic layer 21 towards the substrate 1, and a layer comprising CoZrNb for the soft magnetic layer 21 towards the orientation control layer 3, their respective targets, along with the target for the separation layer 22 interposed between these layers are used for sputtering in sequence for film formation.

Further, in the case of producing the magnetic recording medium of the embodiment shown in FIG. 4 of FIG. 5, by iteratively carrying out the processes for forming the soft magnetic underlayer 2, it is possible to form the soft magnetic underlayer 2 shown in FIG. 4 or FIG. 5. Furthermore, by the same technique, even in the case that the material of the soft magnetic layer 21 differs depending on the layer, it is possible to form the soft magnetic underlayer 2 by sequential lamination by using targets of different materials.

In the method for producing the above magnetic recording medium, in the case of using a magnetic layer with a multilayer structure of Co or a Co alloy and Pt or Pd or their alloys, for the perpendicular magnetic layer 4, a first target comprising a Co or Co alloy material, and a second target comprising a Pt and/or Pd material are alternately used, and the materials of each target are alternately sputtered to form the perpendicular magnetic layer 4.

In the case of applying an oxidation treatment to the surface of the soft magnetic underlayer 2 or to the magnetization stabilizing layer 7, the degree of oxidation and the amount of oxygen applied to the surface of the soft magnetic underlayer 2 or the magnetization stabilizing layer 7 can be set by holding them for a predetermined time in an atmosphere of oxygen or a mixed gas comprising a mixture of argon or the like and oxygen.

Alternatively, after forming the above soft magnetic underlayer 2 (soft magnetic layer 21 or separation layer 22) or the magnetization stabilizing layer 7, using the same targets used for formation of these layers, by sputtering using a process gas in which oxygen is mixed with a rare gas such as argon, a layer comprising oxygen can be formed on top of the soft magnetic underlayer 2 or the magnetization stabilizing layer 7.

Alternatively, during the formation of the soft magnetic underlayer 2 or the magnetization stabilizing layer 7, oxygen is mixed into the processing gas during only a predetermined time. More specifically, for example, if the soft magnetic underlayer 2 if formed by sputtering with argon, during only part of the layer formation time (for example, during the last second before the layer formation ends), sputtering is carried out with oxygen mixed into the argon.

As the method for forming the protective layer 5, it is possible to use a method of forming a carbon film by sputtering using a carbon target, the CVD method or the ion beam method. Further, it is possible to apply a method of forming a thin film of $SiO_2$ or $ZrO_2$ by RF sputtering using a target of $SiO_2$ or $ZrO_2$, or reactive sputtering using an Si or Zr target and an oxygen containing gas as a process gas.

In the method of producing the magnetic recording medium of the present invention, it is preferable to use the CVD method or the ion beam method as the method for forming the protective layer 5. If these film forming methods are used, in addition to being able to form a protective film 5 having an very high degree of hardness and excellent characteristics, the film thickness can be made significantly smaller than the carbon layers of the prior art, and therefore, it is possible to carry out high density recording and reproducing with a very small distance between the perpendicular magnetic layer 4 and the magnetic head which records and reproduces the information.

Magnetic Recording and Reproducing Device

FIG. 7 shows a cross sectional view of one example of the magnetic recording and reproducing device according to the present invention. The magnetic recording and reproducing device of this figure is provided with the magnetic recording medium 25 constituted as shown in FIG. 1 or FIGS. 4–6; a medium driving portion 26 which rotationally drives the magnetic recording medium 25; a magnetic head 27 which carries out recording and reproducing of information to and from the magnetic recording medium; a head driving portion 28; and a recorded and reproduced signal processing system 29. The recorded and reproduced signal processing system 29 processes the input data and sends a recording signal to the magnetic head 27, and outputs data by processing the reproduced signal from the recording head 27.

Further, in the magnetic recording and reproducing device according to the present invention, it is preferable for the protective layer which is a component of the magnetic recording medium to be constituted of a CVD carbon film or an ion beam carbon film. By means of this constitution, it is possible to carry out high density recording and reproducing with a small spacing between the magnetic head 27 and the magnetic layer of the magnetic recording medium 25. Further, if the magnetic recording medium is provided with a magnetization stabilizing layer, and it is possible to provide a magnetic recording and reproducing device with excellent demagnetization heat resistance and reliability.

Especially, in the above magnetic recording and reproducing device, if a single magnetic pole head is used as the magnetic head 27, by forming a closed magnetic path between the magnetic head 27 and the magnetic recording medium 25, the efficiency of transmission of the magnetic flux between the magnetic head 27 and the recording medium 25 is further improved, and the magnetization of the perpendicular magnetic layer of the magnetic recording medium can be strengthened, and therefore, high density recording and reproducing is possible.

EXAMPLES

The effects of the present invention will be shown below with reference to examples. However, the present invention is not limited to the following examples.

Example 1

A cleaned glass substrate (Ohara K. K., with a 2.5 inch diameter) was positioned in the film forming chamber of a DC magnetron sputtering device (Anelva K. K. C-3010), which was evacuated to a vacuum of $2 \times 10^{-7}$ Pa, after which a film formation was carried out on the glass substrate to form a 60 nm soft magnetic layer by sputtering using an 86Fe-9Al-5Si target with a substrate temperature of 100° C. or below. Then, on this soft magnetic layer, a 0.8 nm separation layer was formed using an Ru target, and another 60 nm soft magnetic layer was formed using an 89Co-4Zr-7Nb target to form a laminate.

Next, the substrate was heated to 200° C., and an orientation control layer having a laminated structure was formed on top of the soft magnetic underlayer, using a 50Ni-50Al target to a thickness of 8 nm and an Ru target to a thickness of 20 nm, and after this, a perpendicular magnetic layer with a thickness of 30 nm was formed using a target of 62Co-20Cr-14Pt-4B. Further, in the above sputtering process, film formation was carried out using argon as the process gas at a pressure of 0.5 Pa.

Next, a protective layer comprising a 5 nm film of DLC was formed using the CVD method.

Next, a lubrication layer comprising a perfluoropolyether was formed on top of the protective layer 6 by dip coating with a thickness of 2 nm. The magnetic recording medium of the first embodiment was formed by the above processes.

Examples 2–6

Next, as Examples 2–6, magnetic recording media were made in with the same constitution and by the same processes as for the above Example 1, with the exception of using the materials indicated in the Table 1 below for the soft magnetic layers.

Comparative Example 1

Next, as Comparative Example 1, a magnetic recording medium was made in the same way as the above Example 1, except that a material with a structure having no magnetic domain walls was not used for the soft magnetic layers.

Comparative Examples 2 and 3

Next, as Comparative Examples 2 and 3, magnetic recording media were made in the same was as the above Example 1, except that a target of 89Fe-9Al-5Si was used to form the individual soft magnetic layers of the soft magnetic underlayer in such a way that they respectively had a product of the saturation magnetic flux density and the layer thickness Bs·t (T·nm) of 120 (T·nm) and 60 (T·nm).

For the magnetic recording media of Examples 1–6 and Comparative Examples 1–3, evaluations were carried out for the recording and reproducing characteristics and demagnetization heat resistance. The evaluation of the electromagnetic conversion characteristics was carried out using a RWA-1632 read write analyzer and a S1701MP spin stand by GUZIK K. K. Further, a single magnetic pole head was used as the recording and reproducing head, and the error rate was measured at a linear recording density of 600 kFCI.

Further, the value of the thermal demagnetization resistance was calculated based on the drop in output rate (%/decade) compared to reproducing one second after writing with a linear density of 50 kFCI, with the substrate heated to 70° C. based on $(S_o-S) \times 100/(S_o \times 3)$. In this formula, $S_o$ is the reproducing output one second after the writing signal is applied to the recording medium, and S is the reproducing output after 1000 seconds.

The results of the above measurements are shown in Table 1. As shown in Table 1, for the magnetic recording media of Examples 1–6, which satisfy the requirements of the present invention, there was no generation of spike noise, while the presence of spike noise was confirmed in the recording medium of Comparative Example 1, and the error rate increased. Further, in the magnetic recording media of Comparative Examples 2 and 3, while no spike noise was observed, there was a high level of medium noise, and there were increased error rates.

TABLE 1

|  | Soft Magnetic Layer 1 (Towards Substrate) | | Separation Layer | | Soft Magnetic Layer 2 | | Error | Occurrence of |
|---|---|---|---|---|---|---|---|---|
|  | Material (at. %) | Bs · t (T · nm) | Material (at. %) | Thickness (nm) | Material (at. %) | Bs · t (T · nm) | Rate ($10^x$) | Spike Noise Yes/No |
| Example 1 | 86Fe9Al5Si | 60 | Ru | 0.8 | 89Co4Zr7Nb | 60 | −5.8 | No |
| Example 2 | 80Fe10Ta10C | 60 | Ru | 0.8 | 89Co4Zr7Nb | 60 | −5.9 | No |
| Example 3 | 80Fe10Ta10N | 60 | Ru | 0.8 | 89Co4Zr7Nb | 60 | −6.1 | No |
| Example 4 | S6Fe9Al5Si | 60 | Ru | 0.8 | 86Fe9Al5Si | 60 | −5.0 | No |
| Example 5 | 85Fe15C | 60 | Ru | 0.8 | 89Co4Zr7Nb | 60 | −6.1 | No |
| Example 6 | 75Fe25C | 60 | Ru | 0.8 | 89Co4Zr7Nb | 60 | −6.2 | No |
| Comparative Example 1 | 89Co4Zr7Nb | 60 | Ru | 0.8 | 89Co4Zr7Nb | 60 | −5.2 | Yes |
| Comparative Example 2 | 86Fe9Al5Si | 120 | — | — | — | — | −2.8 | No |
| Comparative Example 3 | 86Fe9Al5Si | 60 | — | — | 89Co4Zr7Nb | 60 | −3.2 | No |

Examples 7 and 8

Next, magnetic recording media were produced in the same way as for the above Example 1, with the exception that the separation layer of the soft magnetic underlayer was constituted of the materials shown in Table 2.

The recording and reproducing characteristics of magnetic recording media of the above Examples 7 and 8 were evaluated. The results are shown in Table 2. As shown in this table, in the case that a soft magnetic material is used as for the separation layer, it is possible to obtain an excellent error rate without observing spike noise.

substrate 1, and the soft magnetic layer provided towards the orientation control layer. The constitution of the soft magnetic underlayer is shown in Table 3.

Evaluations were carried out for the recording and reproducing characteristics of the magnetic recording medium of the above Example 9. As shown in this table, when using a soft magnetic material as the separation layer, it is possible to obtain an excellent error rate without observing spike noise.

TABLE 2

|  | Soft Magnetic Layer 1 (Towards Substrate) | | Separation Layer | | Soft Magnetic Layer 2 | | Error | Occurrence of |
|---|---|---|---|---|---|---|---|---|
|  | Material (at. %) | Bs · t (T · nm) | Material (at. %) | Thickness (nm) | Material (at. %) | Bs · t (T · nm) | Rate ($10^x$) | Spike Noise Yes/No |
| Example 1 | 86Fe9Al5Si | 60 | Ru | 0.8 | 89Co4Zr7Nb | 60 | −5.8 | No |
| Example 7 | 86Fe9Al5Si | 60 | 80Fe10Ta10C | 2 | 89Co4Zr7Nb | 60 | −4.9 | No |
| Example 8 | 80Fe10Ta10N | 60 | 80Fe10Ta10N | 2 | 89Co4Zr7Nb | 60 | −4.9 | No |

TABLE 3

|  | Soft Magnetic Layer 1 (Towards Substrate) | | Separation Layer | | Soft Magnetic Layer 2 | | Error | Occurrence of |
|---|---|---|---|---|---|---|---|---|
|  | Material (at. %) | Bs · t (T · nm) | Material (at. %) | Thickness (nm) | Material (at. %) | Bs · t (T · nm) | Rate ($10^x$) | Spike Noise Yes/No |
| Example 1 | 86Fe9Al5Si | 60 | Ru | 0.8 | 89Co4Zr7Nb | 60 | −5.8 | No |
| Example 9 | 89Co4Zr7Nb | 60 | Ru | 0.8 | 86Fe9Al5Si | 60 | −5.5 | No |

Example 9

Next, a magnetic recording medium was produced in the same way as for the above Example 1, with the exception that a soft magnetic layer using a material with a structure having no magnetic domain walls was provided towards the

Examples 10–12

Next, magnetic recording media were produced in the same way as for the above Example 1, with the exception that, as shown in Table 4, the materials constituting the separation layer and their thickness were changed.

Evaluations were carried out for the recording and reproducing characteristics of the magnetic recording media of the above Examples 10–12. The results are shown in Table 4. As shown in this table, if the material of the separation layer is changed, it is possible to obtain an excellent error rate without observing spike noise.

Examples 16 and 17

Next, magnetic recording media were produced in the same way as for the above Example 1, with the exception that, during formation of the soft magnetic layers, a magnetic field was applied in the radial direction of the substrate, oriented towards the periphery of the substrate or towards the center of the substrate, so that the direction of magnetization of the soft magnetic layers is the radial direction of the substrate, oriented towards the periphery of the substrate or towards the center of the substrate.

Evaluations were carried out for the recording and reproducing characteristics of the magnetic recording media of the above Examples 16 and 17. The results are shown in Table 6. As shown in this table, if the directions of the magnetizations of the soft magnetic layers are made anti-parallel, or if the direction of the magnetization is along the radius of the substrate and oriented towards the periphery of the substrate or towards the center of the substrate, it is possible to obtain an excellent error rate without observing spike noise.

TABLE 4

|  | Soft Magnetic Layer 1 (Towards Substrate) | | Separation Layer | | Soft Magnetic Layer 2 | | Error | Occurrence of |
| --- | --- | --- | --- | --- | --- | --- | --- | --- |
|  | Material (at. %) | Bs · t (T · nm) | Material (at. %) | Thickness (nm) | Material (at. %) | Bs · t (T · nm) | Rate ($10^x$) | Spike Noise Yes/No |
| Example 1 | 86Fe9Al5Si | 60 | Ru | 0.8 | 89Co4Zr7Nb | 60 | −5.8 | No |
| Example 10 | 86Fe9Al5Si | 60 | Ir | 0.3 | 89Co4Zr7Nb | 60 | −6.3 | No |
| Example 11 | 86Fe9Al5Si | 60 | Rh | 0.6 | 89Co4Zr7Nb | 60 | −6.1 | No |
| Example 12 | 86Fe9Al5Si | 60 | Ru15Co | 0.8 | 89Co4Zr7Nb | 60 | −5.8 | No |

Examples 13–15

Next, magnetic recording media were produced in the same way as for the above Example 1, with the exception that, as shown in Table 5, a soft magnetic layer using a material with a structure having no magnetic domain walls is provided on the side of the substrate 1, and a different soft magnetic layer is provided at the side of the orientation control layer, and the thickness of each of these soft magnetic layers was changed.

Evaluations were carried out for the recording and reproducing characteristics of the magnetic recording media of the above Examples 13–15. The results are shown in Table 5. As shown in this table, if the thickness of each soft magnetic layer is changed, it is possible to obtain an excellent error rate.

TABLE 5

|  | Soft Magnetic Layer 1 (Towards Substrate) | | Separation Layer | | Soft Magnetic Layer 2 | | Error | Occurrence of |
| --- | --- | --- | --- | --- | --- | --- | --- | --- |
|  | Material (at. %) | Bs · t (T · nm) | Material (at. %) | Thickness (nm) | Material (at. %) | Bs · t (T · nm) | Rate ($10^x$) | Spike Noise Yes/No |
| Example 1 | 86Fe9Al5Si | 60 | Ru | 0.8 | 89Co4Zr7Nb | 60 | −5.8 | No |
| Example 13 | 86Fe9Al5Si | 140 | Ru | 0.8 | 89Co4Zr7Nb | 140 | −5.2 | No |
| Example 14 | 86Fe9Al5Si | 200 | Ru | 0.8 | 89Co4Zr7Nb | 200 | −4.2 | Yes |
| Example 15 | 86Fe9Al5Si | 60 | Ru | 0.8 | 89Co4Zr7Nb | 60 | −5.8 | No |

TABLE 6

|  | Soft Magnetic Layer 1 (Towards Substrate) | | | Separation Layer | | Soft Magnetic Layer 2 | | | Error | Occurrence of |
| --- | --- | --- | --- | --- | --- | --- | --- | --- | --- | --- |
|  | Material (at. %) | Bs · t (T · nm) | Magnet. Direction | Material (at. %) | Thickness (nm) | Material (at. %) | Bs · t (T · nm) | Magnet. Direction | Rate ($10^x$) | Spike Noise Yes/No |
| Ex. 1 | 86Fe9Al5Si | 60 | — | Ru | 0.8 | 89Co4Zr7Nb | 60 | — | −5.8 | No |
| Ex. 16 | 86Fe9Al5Si | 60 | Towards periphery | Ru | 0.8 | 89Co4Zr7Nb | 60 | Towards center | −6.5 | No |
| Ex. 17 | 86Fe9Al5Si | 60 | Towards center | Ru | 0.8 | 89Co4Zr7Nb | 60 | Towards periphery | −6.5 | No |

Examples 18 and 19

Next, magnetic recording media were produced in the same way as for the above Example 1, with the exception that, as shown in Table 7, a soft magnetic layer using a material with a structure having no magnetic domain walls is provided on the side of the substrate 1, and a different soft magnetic layer is provided at the side of the orientation control layer, and each of these soft magnetic layers has different thicknesses.

Evaluations were carried out for the recording and reproducing characteristics of the magnetic recording media of the above Examples 18 and 19. The results are shown in Table 7. As shown in this table, if two soft magnetic layers each having different thicknesses are used, it is possible to obtain an excellent error rate without observing spike noise.

Example 23

Next, a magnetic recording medium was produced in the same way as for the above Example 1, with the exception that, as shown in Table 9, after formation of the soft magnetic underlayer, the surface of the soft magnetic underlayer was oxidized by maintaining it in an atmosphere of a mixed gas of argon and oxygen at an partial oxygen pressure of 0.05 Pa.

Evaluations were carried out for the recording and reproducing characteristics of the magnetic recording medium of the above Example 23. The results are shown in Table 9. As shown in this table, in the magnetic recording medium of Example 23 wherein the surface of the soft magnetic layer is oxidized, it is possible to obtain an excellent error rate without observing spike noise. This is because, as a result of the oxidation process, fluctuations in the magnetization in the vicinity of the surface of the soft magnetic underlayer can be inhibited, and the medium noise can be effectively reduced.

TABLE 7

|  | Soft Magnetic Layer 1 (Towards Substrate) | | Separation Layer | | Soft Magnetic Layer 2 | | Error | Occurrence of |
| --- | --- | --- | --- | --- | --- | --- | --- | --- |
|  | Material (at. %) | Bs · t (T · nm) | Material (at. %) | Thickness (nm) | Material (at. %) | Bs · t (T · nm) | Rate ($10^x$) | Spike Noise Yes/No |
| Example 1  | 86Fe9Al5Si | 60 | Ru | 0.8 | 89Co4Zr7Nb | 60 | −5.8 | No |
| Example 18 | 86Fe9Al5Si | 30 | Ru | 0.8 | 89Co4Zr7Nb | 90 | −6.1 | No |
| Example 19 | 86Fe9Al5Si | 90 | Ru | 0.8 | 89Co4Zr7Nb | 30 | −5.2 | No |

Examples 20–22

Next, magnetic recording media were produced in the same way as for the above Example 1, with the exception that, as shown in Table 8, the soft magnetic underlayer was constituted of three layers of the soft magnetic layers.

Evaluations were carried out for the recording and reproducing characteristics of the magnetic recording media of the above Examples 20–22. The results are shown in Table 8. As shown in this table, if the soft magnetic underlayer comprises three soft magnetic layers, it is possible to obtain an excellent error rate without observing spike noise.

TABLE 8

|  | Soft Magnetic Layer 1 (Towards Substrate) | | Separation Layer 1 | | Soft Magnetic Layer 2 | | Separation Layer 2 | | Soft Magnetic Layer 3 | | Error | Occurrence of |
| --- | --- | --- | --- | --- | --- | --- | --- | --- | --- | --- | --- | --- |
|  | Material (at. %) | Bs · t (T · nm) | Material (at. %) | Thickness (nm) | Material (at. %) | Bs · t (T · nm) | Material (at. %) | Thickness (nm) | Material (at. %) | Bs · t (T · nm) | Rate ($10^x$) | Spike Noise Yes/No |
| Ex. 1  | 86Fe9Al5Si | 60 | Ru | 0.8 | 89Co4Zr7Nb | 60 | — | — | — | — | −5.8 | No |
| Ex. 20 | 86Fe9Al5Si | 40 | Ru | 0.8 | 89Co4Zr7Nb | 40 | Ru | 0.8 | 89Co4Zr7Nb | 40 | −6.4 | No |
| Ex. 21 | 89Co4Zr7Nb | 40 | Ru | 0.8 | 86Fe9Al5Si | 40 | Ru | 0.8 | 89Co4Zr7Nb | 40 | −5.8 | No |
| Ex. 22 | 86Fe9Al5Si | 40 | Ru | 0.8 | 89Co4Zr7Nb | 40 | Ru | 0.8 | 86Fe9Al5Si | 40 | −5.8 | No |

TABLE 9

|  | Soft Magnetic Layer 1 (Towards Substrate) | | Separation Layer | | Soft Magnetic Layer 2 | | Surface Oxid. | Error | Occurrence of |
| --- | --- | --- | --- | --- | --- | --- | --- | --- | --- |
|  | Material (at. %) | Bs · t (T · nm) | Material (at. %) | Thickness (nm) | Material (at. %) | Bs · t (T · nm) | Yes/No | Rate ($10^x$) | Spike Noise Yes/No |
| Example 1 | 86Fe9Al5Si | 60 | Ru | 0.8 | 89Co4Zr7Nb | 60 | No | −5.8 | No |

TABLE 9-continued

| | Soft Magnetic Layer 1 (Towards Substrate) | | Separation Layer | | Soft Magnetic Layer 2 | | Surface | Error | Occurrence of |
|---|---|---|---|---|---|---|---|---|---|
| | Material (at. %) | Bs · t (T · nm) | Material (at. %) | Thickness (nm) | Material (at. %) | Bs · t (T · nm) | Oxid. Yes/No | Rate ($10^x$) | Spike Noise Yes/No |
| Example 23 | 86Fe9Al5Si | 60 | Ru | 0.8 | 89Co4Zr7Nb | 140 | Yes | −6.8 | No |

Example 24

Next, a magnetic recording medium was produced in the same way as for the above Example 1, with the exception that a magnetization stabilizing layer with the composition shown in Table 10 was formed on top of the perpendicular magnetic layer, in order to clarify the effect of the formation of the magnetization stabilizing layer on the perpendicular magnetic layer.

Evaluations were carried out for the recording and reproducing characteristics of the magnetic recording medium of the above Example 24. The results are shown in Table 10. As shown in this table, in the magnetic recording medium of Example 24 provided with the magnetization stabilizing layer, it is possible to obtain an excellent error rate without observing spike noise. Further, the demagnetization heat resistance can also be improved.

layers, the magnetizations of the soft magnetic layers will cancel each other, and it is possible to reduce the medium noise generated by the soft magnetic layers.

In the magnetic recording medium, each of the soft magnetic underlayer has a product Bs·t (T·nm), of the saturation magnetic flux density Bs (T), and the layer thickness t (nm) of 3 (T·nm) or more, and it is possible to suppress the formation of very large magnetic domains and inhibit the generation of spike noise in the magnetic recording medium.

In the magnetic recording medium, if the saturation magnetic flux density of the soft magnetic layer is 0.4 T or more, it is possible to form a structure which achieves sufficient magnetic flux density in the closed magnetic path between the magnetic head and the soft magnetic underlayer during reproducing, and it is possible to more strongly fix

TABLE 10

| | Soft Magnetic Layer 1 (Towards Substrate) | | Separation Layer | | Soft Magnetic Layer 2 | | Bs · t (T · nm) of Magnet. Stabil. Layer | Reproducing Output (uV) | Error Rate ($10^x$) | Occurrence of Spike Noise Yes/No | Demagn. Heat Resistance (%/decade) |
|---|---|---|---|---|---|---|---|---|---|---|---|
| | Material (at. %) | Bs · t (T · nm) | Material (at. %) | Thickness (nm) | Material (at. %) | Bs · t (T · nm) | | | | | |
| Ex. 1 | 86Fe9Al5Si | 60 | Ru | 0.8 | 89Co4Zr7Nb | 60 | — | 1650 | −5.8 | No | 0.55 |
| Ex. 24 | 86Fe9Al5Si | 60 | Ru | 0.8 | 89Co4Zr7Nb | 140 | 2.4 | 2010 | −6.2 | No | 0.42 |

EFFECTS OF THE INVENTION

As explained in detail above, the magnetic recording medium of the present invention is provided, in sequence, with at least one soft magnetic underlayer, an orientation control layer to control the orientation of the layer immediately above it, and a perpendicular magnetic layer having an axis of easy magnetization which is mainly perpendicular to the nonmagnetic substrate, with the soft magnetic underlayer having a multilayer structure comprising a plurality of soft magnetic layers, and one or more separation layers interposed between the soft magnetic layers, and at least one of the soft magnetic layers is constituted of a material with a structure having no magnetic domain walls, and therefore, it is possible to prevent the formation of very large magnetic domains in the surface of the soft magnetic underlayer, and the error rate can be improved.

In the above magnetic recording medium, the separation layer comprises one or more of the elements selected from the group consisting of Ru, Rh, Re, Ir and Cu, and if the thickness of the separation layer is preferably within the range of from 0.1 nm to 5 nm, it is possible to form a bonded antiferromagnetic structure in the soft magnetic underlayer, and therefore, the magnetizations of the soft magnetic layers separated by the separation layer can be made opposite to each other. As a result, along with preventing the formation of very large magnetic domains inside the soft magnetic the magnetization of the perpendicular magnetic layer, and a magnetic recording head suitable for high density recording can be obtained.

In the above magnetic recording medium, if the soft magnetic underlayer has a constitution wherein a part of or all of the surface on the side of the perpendicular magnetic layer is oxidized, it is possible to refine the crystal particle diameter of the orientation control layer formed on top of the soft magnetic underlayer, and reduce the noise. Further, it is possible to inhibit the noise resulting from fluctuations in the magnetization of the surface of the soft magnetic layer, and therefore, a magnetic recording medium having excellent noise characteristics can be obtained.

In the production method of the magnetic recording medium of the present invention, by forming a multilayer structure wherein, on top of a nonmagnetic substrate, at least one soft magnetic underlayer, an orientation control layer for controlling the orientation of the layer formed immediately above, and a perpendicular magnetic layer having an axis of easy magnetization which is oriented mainly perpendicularly with respect to the nonmagnetic substrate, are formed as a laminate, and the soft magnetic underlayer has a multilayer structure comprising a plurality of soft magnetic layers comprising a soft magnetic material and one or more separation layers interposed between the soft magnetic layers, and at least one of the soft magnetic underlayers comprises a material with a structure having no magnetic domain walls, and therefore, it is possible to prevent the formation of very large magnetic domains, and it is easy to constitute the magnetic recording medium which can suppress spike noise.

The magnetic recording and reproducing device of the present invention is provided with a magnetic recording medium comprising at least one nonmagnetic substrate, a soft magnetic underlayer, an orientation control layer to control the orientation of the layer formed directly above, and a perpendicular magnetic layer having an axis of easy magnetization which is oriented mainly perpendicularly with respect to the nonmagnetic substrate, and a magnetic head for carrying out the recording and reproducing of information to and from the magnetic recording medium, and the soft magnetic underlayer of the magnetic recording medium is formed to have a multilayer structure having a plurality of soft magnetic layers comprising a soft magnetic material, and one or more separation layers interposed between the soft magnetic layers, and at least one of the soft magnetic layers is a material with a structure having no magnetic domain walls, and therefore, it is possible to prevent increases in the error rate due to spike noise, and carry out the recording and reproducing of information at a high density.

The invention claimed is:

1. A magnetic recording medium comprising, in sequence, on a nonmagnetic substrate:
    at least one soft magnetic underlayer;
    an orientation control layer
    a nonmagnetic intermediate layer; and
    a perpendicular magnetic layer having an axis of easy magnetization which is oriented mainly perpendicularly to the nonmagnetic substrate,
    wherein said orientation control layer is provided to control the orientation of the perpendicular magnetic layer,
    said nonmagnetic intermediate layer is provided between the orientation control layer and the perpendicular magnetic layer to improve the orientability and the coercive force of the perpendicular magnetic layer, and said nonmagnetic intermediate layer comprises a nonmagnetic alloy of cobalt,
    said soft magnetic underlayer has a multilayer structure consisting of a plurality of soft magnetic layers comprising a soft magnetic material, and one or more separation layers interposed between said soft magnetic layers,
    a direction of magnetization of an upper soft magnetic layer is different from a direction of magnetization of a lower soft magnetic layer, and
    the direction of the magnetization of said soft magnetic layer is along the radius of said nonmagnetic substrate and is oriented towards the periphery of the substrate or towards the center of said nonmagnetic substrate.

2. A magnetic recording medium according to claim 1, wherein the soft magnetic material comprises one selected from FeAlSi, FeTaN, FeTaC, FeC, FeAlSi alloys, FeTaN alloys, and FeTaC alloys.

3. A magnetic recording medium according to claim 1, wherein the separation layer comprises 50 at. % or more of one or more of the elements Ru, Rh, Re, Ir, and Cu.

4. A magnetic recording medium according to claim 1, wherein the separation layer is constituted of a soft magnetic material that is different from the material constituting the soft magnetic layers between which the separation layer is interposed.

5. A magnetic recording medium according to claim 1, wherein the product Bs·t (T·nm) of the saturation magnetic flux density per layer Bs (T) of the soft magnetic layer and the thickness of the soft magnetic layer t (nm), is 3 T·nm or more for each of the soft magnetic layers.

6. A magnetic recording medium according to claim 1, wherein the magnetic flux density of the soft magnetic layer is 0.4 T or more.

7. A magnetic recording medium according to claim 1, wherein the thickness of the soft magnetic underlayer is 40 nm or more.

8. A magnetic recording medium according to claim 1, wherein the thickness of the separation layer is in the range from 0.1 nm to 5 nm.

9. A magnetic recording medium according to claim 1, wherein among sets of an upper and a lower soft magnetic layers between which a separation layer is interposed, at least one set has directions of magnetization which are antiparallel.

10. A magnetic recording medium according to claim 1, wherein a hard magnetic layer is formed between the nonmagnetic substrate and the soft magnetic underlayer, and the magnetization of said hard magnetic layer is directed along the radius of the substrate and towards the periphery or the center of the substrate, and bonded with the magnetization of the soft magnetic layer which is the lowest layer of the soft magnetic underlayer.

11. A magnetic recording medium according to claim 1, wherein the lowest layer of the soft magnetic underlayer comprises a material of one selected from the group consisting of FeAlSi, FeTaN, FeTaC, FeAlSi alloys, FeTaN alloys, and FeTaC alloys.

12. A magnetic recording medium according to claim 1, wherein the top layer of the soft magnetic underlayer is a soft magnetic layer.

13. A magnetic recording medium according to claim 1, wherein a part of the surface or all of the surface of the soft magnetic underlayer nearest the perpendicular magnetic layer is oxidized.

14. A magnetic recording medium according to claim 1, wherein the thickness of the orientation control layer is in the range from 8 nm to 50 nm.

15. A magnetic recording medium according to claim 1, wherein the material of the orientation control layer comprises one selected from NiAl, FeAl, CoFe, CoZr, AlCo, Zr, Y, Zn, Ru, Re, Hf, Ni, Pd, Pt, Al, Cu, Ag, Ir, Si, Co, and Si or Co alloys.

16. A magnetic recording medium according to claim 1, further comprising:
    a magnetization stabilizing layer comprising a soft magnetic material formed on the perpendicular magnetic layer; and
    a protective layer on the magnetization stabilizing layer.

17. A method for producing a magnetic recording medium on a nonmagnetic substrate, comprising the steps of:
    forming at least one soft magnetic underlayer,
    forming an orientation control layer,
    forming a nonmagnetic intermediate layer, said nonmagnetic intermediate layer comprises a nonmagnetic alloy of cobalt; and
    forming a perpendicular magnetic layer having an axis of easy magnetization which is oriented mainly perpendicularly to the substrate,
    wherein said orientation control layer is provided to control the orientation of the perpendicular magnetic layer,
    said nonmagnetic intermediate layer is provided to improve the orientability and the coercive force of the perpendicular magnetic layer, the soft magnetic underlayer having a multilayer structure consisting of a plurality of soft magnetic layers comprising a soft magnetic material, and one or more separation layers interposed between said soft magnetic layers, and a magnetization of said soft magnetic layer is directed along the radius of said nonmagnetic substrate towards the periphery or the center of said nonmagnetic substrate.

18. A method for producing a magnetic recording medium according to claim 17, wherein the soft magnetic material comprises one selected from the group consisting of FeAlSi, FeTaN, FeTaC, FeC, FeAlSi alloys, FeTaN alloys, and FeTaC alloys.

19. A method for producing a magnetic recording medium according to claim 17 wherein a treatment for oxidizing the surface of the soft magnetic underlayer is included.

20. A method for producing a magnetic recording medium according to claim 17, wherein the thickness of the orientation control layer is in the range from 8 nm to 50 nm.

21. A method for producing a magnetic recording medium according to claim 17, wherein the material of the orientation control layer comprises one selected from NiAl, FeAl, CoFe, CoZr, AlCo, Zr, Y, Zn, Ru, Re, Hf, Ni, Pd, Pt, Al, Cu, Ag, Ir, Si, Co, and Si or Co alloys.

22. A magnetic recording and reproducing device comprising:
  a magnetic recording medium having a nonmagnetic substrate, at least one soft magnetic underlayer, an orientation control layer a nonmagnetic intermediate layer, said nonmagnetic layer comprises a nonmagnetic alloy of cobalt, and a perpendicular magnetic layer having an axis of easy magnetization which is oriented mainly perpendicularly to the nonmagnetic substrate; and
  a magnetic head for carrying out recording and reproducing of the information to and from the magnetic recording medium,
  wherein said orientation control layer is provided to control the orientation of the perpendicular magnetic layer,
  said nonmagnetic intermediate layer is provided between the orientation control layer and the perpendicular magnetic layer to improve the orientability and the coercive force of the perpendicular magnetic layer,
  the soft magnetic underlayer of the magnetic recording medium has a multilayer structure consisting of a plurality of soft magnetic layers comprising a soft magnetic material, and one or more separation layers interposed between the soft magnetic layers, and
  a magnetization of said soft magnetic layer is directed along the radius of said nonmagnetic substrate towards the periphery or the center of said nonmagnetic structure.

23. A magnetic recording and reproducing device according to claim 22, wherein the soft magnetic material comprises one selected from the group consisting of FeAlSi, FeTaN, FeTaC, FeC, FeAlSi alloys, FeTaN alloys, and FeTaC alloys.

24. A magnetic recording medium comprising, in sequence, on a nonmagnetic substrate:
  at least one soft magnetic underlayer;
  an orientation control layer;
  a perpendicular magnetic layer having an axis of easy magnetization which is oriented mainly perpendicularly to the nonmagnetic substrate, wherein said orientation control layer is provided to control the orientation of the perpendicular magnetic layer;
  a magnetization stabilizing layer comprising a soft magnetic material formed on the perpendicular magnetic layer; and
  a protective layer on the magnetization stabilizing layer,
  wherein said soft magnetic underlayer has a multilayer structure consisting of a plurality of soft magnetic layers comprising a soft magnetic material, and one or more separation layers interposed between said soft magnetic layers, at least one of said soft magnetic layers,
  a direction of magnetization of an upper soft magnetic layer is different from a direction of magnetization of a lower soft magnetic layer, and
  the direction of the magnetization of said soft magnetic layer is along the radius of said nonmagnetic substrate and is oriented towards the periphery of the substrate or towards the center of said nonmagnetic substrate.

25. A method for producing a magnetic recording medium on a nonmagnetic substrate, comprising the steps of:
  forming at least one soft magnetic underlayer;
  forming an orientation control layer;
  forming a perpendicular magnetic layer having an axis of easy magnetization which is oriented mainly perpendicularly to the nonmagnetic substrate, wherein said orientation control layer is provided to control the orientation of the perpendicular magnetic layer;
  forming a magnetization stabilizing layer comprising a soft magnetic material formed on the perpendicular magnetic layer; and
  forming a protective layer on the magnetization stabilizing layer,
  wherein said soft magnetic underlayer has a multilayer structure consisting of a plurality of soft magnetic layers comprising a soft magnetic material, and one or more separation layers interposed between said soft magnetic layers, at least one of said soft magnetic layers,
  a direction of magnetization of an upper soft magnetic layer is different from a direction of magnetization of a lower soft magnetic layer, and
  the direction of the magnetization of said soft magnetic layer is along the radius of said nonmagnetic substrate and is oriented towards the periphery of the substrate or towards the center of said nonmagnetic substrate.

26. A magnetic recording and reproducing device comprising:
  a magnetic recording medium having a nonmagnetic substrate, at least one soft magnetic underlayer, an orientation control layer, a perpendicular magnetic layer having an axis of easy magnetization which is oriented mainly perpendicularly to the nonmagnetic substrate, wherein said orientation control layer is provided to control the orientation of the perpendicular magnetic layer, a magnetization stabilizing layer comprising a soft magnetic material formed on the perpendicular magnetic layer, and a protective layer on the magnetization stabilizing layer; and
  a magnetic head for carrying out recording and reproducing of information to and from the magnetic recording medium,
  wherein said soft magnetic underlayer has a multilayer structure consisting of a plurality of soft magnetic layers comprising a soft magnetic material, and one or more separation layers interposed between said soft magnetic layers, at least one of said soft magnetic layers, a direction of magnetization of an upper soft magnetic layer is different from a direction of magnetization of a lower soft magnetic layer, and the direction of the magnetization of said soft magnetic layer is along the radius of said nonmagnetic substrate and is oriented towards the periphery of the substrate or towards the center of said nonmagnetic substrate.

* * * * *